United States Patent [19]

O'Loughlin et al.

[11] Patent Number: 5,584,505
[45] Date of Patent: Dec. 17, 1996

[54] INFLATOR ASSEMBLY

[75] Inventors: John P. O'Loughlin; John D. Skouson, both of Mesa, Ariz.

[73] Assignee: TRW Inc., Lyndhurst, Ohio

[21] Appl. No.: 639,351

[22] Filed: Apr. 29, 1996

Related U.S. Application Data

[63] Continuation of Ser. No. 409,871, Mar. 24, 1995, abandoned, which is a continuation of Ser. No. 110,159, Aug. 20, 1993, abandoned.

[51] Int. Cl.$^6$ ................................................. B60R 21/26
[52] U.S. Cl. ............................ 280/737; 280/741; 222/5
[58] Field of Search ................................ 280/737, 736, 280/741; 222/5; 102/530, 531, 202.5; 137/68.2

[56] References Cited

U.S. PATENT DOCUMENTS

| | | | |
|---|---|---|---|
| 3,788,667 | 1/1974 | Vancil | 280/737 |
| 3,806,153 | 4/1974 | Johnson . | |
| 3,810,655 | 5/1974 | Pracher | 280/736 |
| 3,836,170 | 9/1974 | Grosch et al. . | |
| 3,868,124 | 2/1975 | Johnson . | |
| 3,895,821 | 7/1975 | Schotthoefer et al. . | |
| 3,904,221 | 9/1975 | Shiki et al. | 280/736 |
| 3,910,596 | 10/1975 | Wulbrecht et al. . | |
| 3,930,666 | 1/1976 | Lynch et al. | 280/737 |
| 3,960,390 | 6/1976 | Goetz | 280/731 |
| 4,114,924 | 9/1978 | Kasagi et al. | 280/740 |
| 4,275,901 | 6/1981 | Okada | 280/737 |
| 5,031,932 | 7/1991 | Frantom et al. | 280/741 |
| 5,076,607 | 12/1991 | Woods . | |
| 5,078,422 | 1/1992 | Hamilton et al. . | |
| 5,131,680 | 7/1992 | Coultas et al. . | |
| 5,184,846 | 2/1993 | Goetz . | |
| 5,226,668 | 7/1993 | Delonge-Immik et al. | 280/737 |
| 5,230,531 | 7/1993 | Hamilton et al. | 280/737 |
| 5,257,819 | 11/1993 | Frantom et al. | 280/737 |
| 5,301,978 | 4/1994 | Munzel et al. | 280/737 |
| 5,378,018 | 1/1995 | Ketterer et al. | 280/737 |

FOREIGN PATENT DOCUMENTS

| | | |
|---|---|---|
| 0488937 | 6/1992 | European Pat. Off. . |
| 0559335 | 9/1993 | European Pat. Off. . |
| 2107246 | 5/1972 | France . |
| 2158779 | 6/1973 | France . |
| 2207255 | 6/1974 | France . |

*Primary Examiner*—Paul N. Dickson
*Attorney, Agent, or Firm*—Tarolli, Sundheim, Covell, Tummino & Szabo

[57] ABSTRACT

An apparatus (10) for inflating an inflatable device, such as an air bag (12) for restraining a vehicle occupant, comprises a pressure vessel (40), an ignitable propellant material (154) and a cup member (150). The pressure vessel (40) defines a sealed storage chamber (44) containing inflation fluid for inflating the inflatable device. The propellant material (154) produces combustion products including heat for heating the inflation fluid in the storage chamber (44). The cup member (150) has a piston portion (290) which is movable between an unactuated position and an actuated position. The piston portion (290) of the cup member includes a plunger portion (160) which opens the pressure vessel (40) upon movement of the piston portion (290) from the unactuated position to the actuated position. The cup member (150) further has a rupturable portion (178) which holds the piston portion (290) in the unactuated position. The apparatus further includes an igniter (152) for igniting the propellant material (154) and for causing pressure to develop a thrust against the cup member (150). The thrust ruptures the rupturable portion (178) of the cup member (150) and propels the piston portion (290) from the unactuated position to the actuated position.

7 Claims, 8 Drawing Sheets

INFLATOR ASSEMBLY

This application is a continuation of application Ser. No. 08/409,871 filed on Mar. 24, 1995 now abandoned and, which is a continuation of Ser. No. 08/110,159, filed Aug. 20, 1993, now abandoned.

FIELD OF THE INVENTION

The present invention relates to an apparatus for inflating an inflatable device such as an air bag which restrains an occupant of a vehicle during vehicle deceleration indicative of a collision.

BACKGROUND OF THE INVENTION

An apparatus for inflating an inflatable vehicle occupant restraint, such as an air bag, is disclosed in U.S. Pat. No. 5,184,846. The apparatus disclosed in the '846 patent includes a container which stores gas for inflating the vehicle occupant restraint. The apparatus also includes an ignition chamber which contains an ignitable propellant material. The propellant material, when ignited, produces combustion products including heat for augmenting the gas in the container. The ignition chamber is closed by a piston which blocks fluid communication between the propellant material in the ignition chamber and the gas in the container.

The apparatus disclosed in the '846 patent further includes an igniter for igniting the propellant material upon the occurrence of a vehicle collision. The resulting combustion products cause the gas pressure in the ignition chamber to increase to an elevated level. The gas pressure in the ignition chamber then moves the piston into an actuated position. When the piston moves into the actuated position, it opens the container to release the gas to flow from the container to the vehicle occupant restraint. The piston also opens fluid communication between the ignition chamber and the container. The combustion products in the ignition chamber are thus released to flow into the container to increase the pressure of the gas in the container.

SUMMARY OF THE INVENTION

In accordance with the present invention, an apparatus for inflating an inflatable device includes a pressure vessel means, an ignitable material and a cup member. The pressure vessel means defines a sealed storage chamber containing inflation fluid for inflating the inflatable device. The pressure vessel means has walls which encircle an axis and which define a ring shaped portion of the storage chamber centered on the axis. The pressure vessel means further has a closure wall which is rupturable to open an outlet opening through which the inflation fluid flows outward from the storage chamber. The ignitable material produces combustion products including heat for heating and pressurizing the inflation fluid in the storage chamber.

The cup member is located radially inward of the ring shaped portion of the storage chamber, and has a piston portion which is movable between an unactuated position and an actuated position. The piston portion of the cup member includes a plunger means for rupturing the closure wall upon movement of the piston portion from the unactuated position to the actuated position. The cup member further has a rupturable portion which holds the piston portion in the unactuated position.

The apparatus further includes an igniter means for igniting the ignitable material and for causing pressure to develop a thrust against the cup member. The thrust ruptures the rupturable portion of the cup member, and propels the piston portion of the cup member from the unactuated position to the actuated position.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
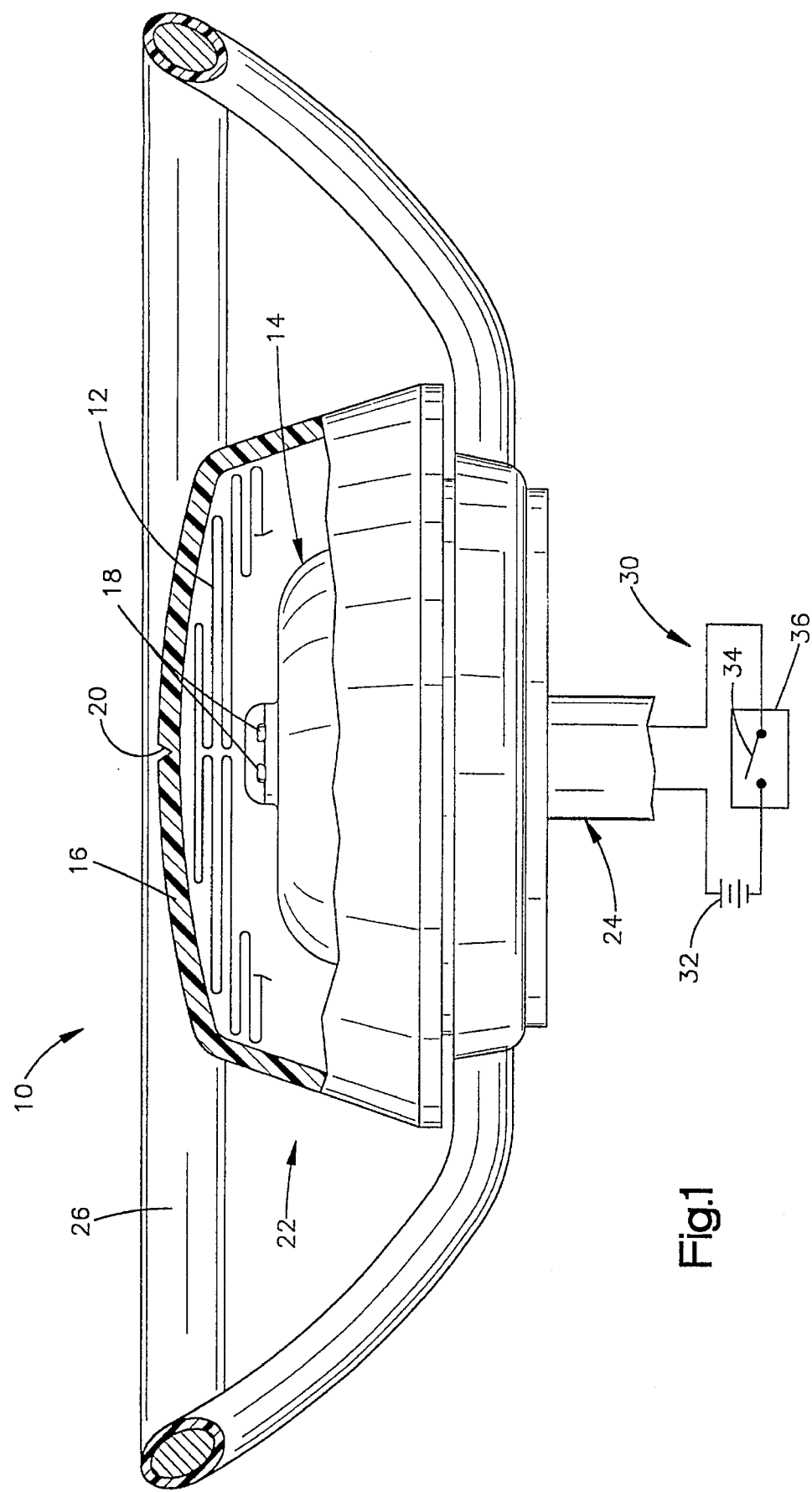
FIG. 1 is a view of a vehicle steering column and a vehicle occupant restraint apparatus constructed as a first embodiment of the present invention.

A first embodiment of the present invention is a vehicle occupant restraint apparatus 10, as shown in FIG. 1. The apparatus 10 includes an inflatable air bag 12, an inflator 14 and a cover 16. The air bag 12 is received over the inflator 14 in a folded condition, as shown schematically in FIG. 1. The inflator 14 has a plurality of gas outlet openings 18 which direct gas from the inflator 14 to the air bag 12 when the air bag 12 is to be inflated. The cover 16 encloses the air bag 12 and the inflator 14 and has a relatively weak portion 20. The air bag 12, the inflator 14 and the cover 16 are parts of a module 22 which is mounted on a vehicle steering column 24 at the center of the steering wheel 26.

As shown schematically in FIG. 1, the vehicle occupant restraint apparatus 10 further includes an electrical circuit 30. The electrical circuit 30 includes a power source 32, which is preferably the vehicle battery or a capacitor, and a normally open switch 34. The switch 34 is preferably part of a deceleration sensor 36. The deceleration sensor 36 senses the occurrence of a predetermined amount of vehicle deceleration indicative of a collision, and closes the switch 34 upon sensing the occurrence of such deceleration. When the switch 34 is closed, electric current passes through the inflator 14 to actuate the inflator 14.

When the inflator 14 is actuated, a large volume of inflation fluid, preferably an inert gas, emerges rapidly from the gas outlet openings 18 and flows into the air bag 12 to inflate the air bag 12. As the air bag 12 begins to inflate, it moves forcefully against the cover 16 and breaks the cover 16 at the relatively weak portion 20. As the air bag 12 continues to inflate, it moves outward past the broken cover 16 and into the space between the driver of the vehicle and the steering wheel 26 to restrain movement of the driver.

Figure 2:
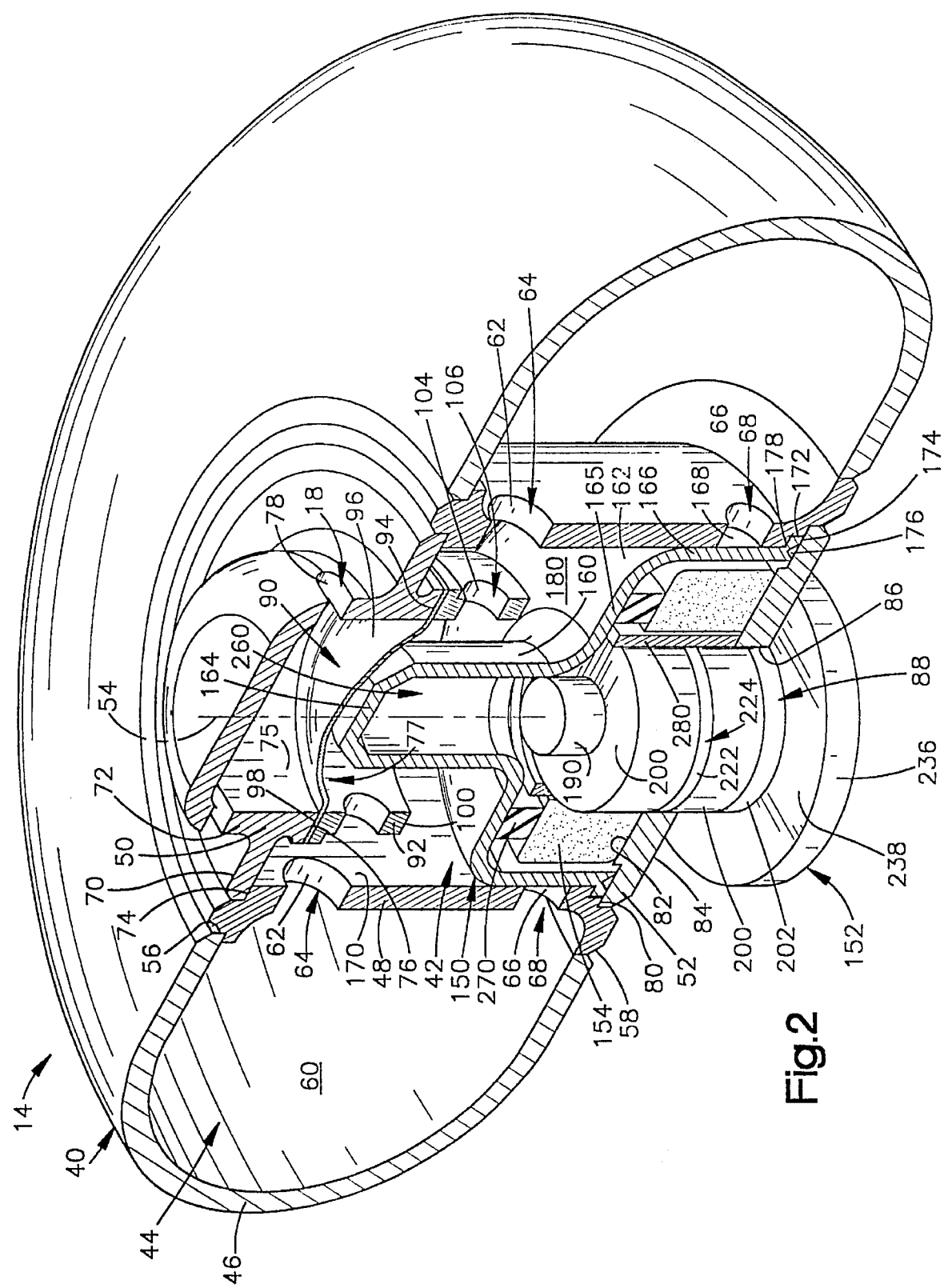
FIG. 2 is a perspective view, partly in section, of parts of the apparatus of FIG. 1.
Figure 3A:
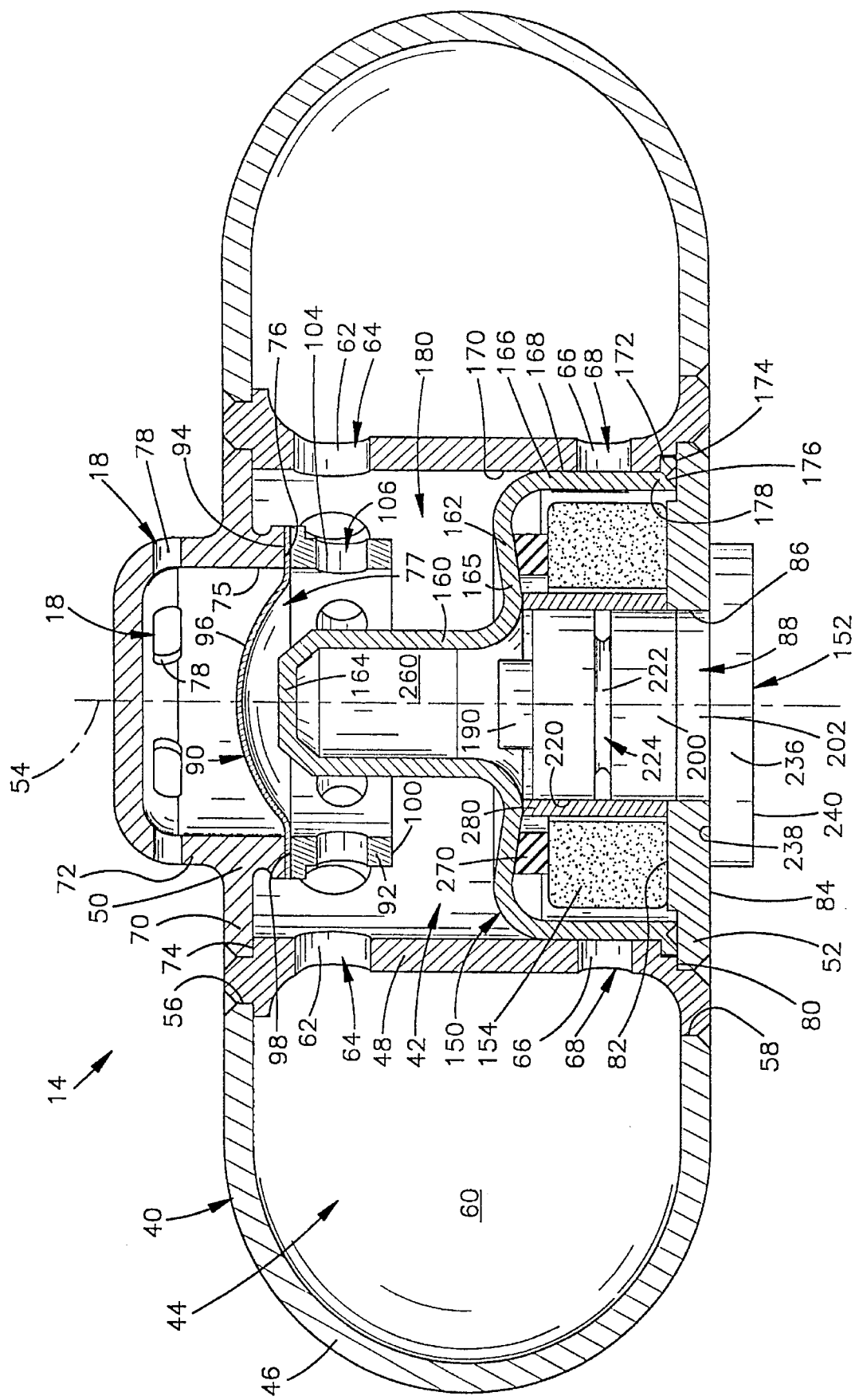
FIG. 3A is a side view of the parts shown in FIG. 2.
Figure 3B:
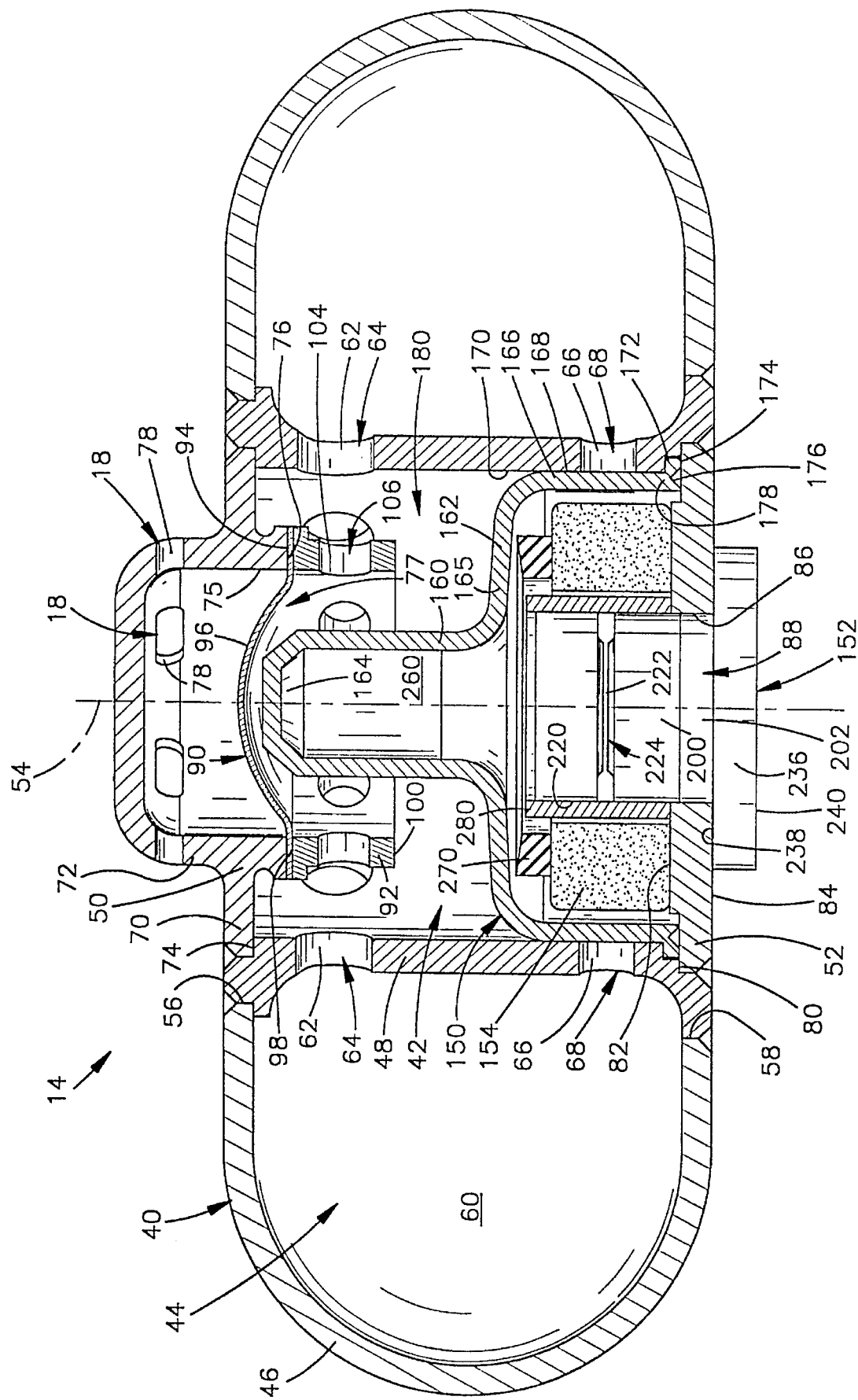
FIG. 3B is a view showing the parts of FIG. 3A in a partially actuated condition.
Figure 4:
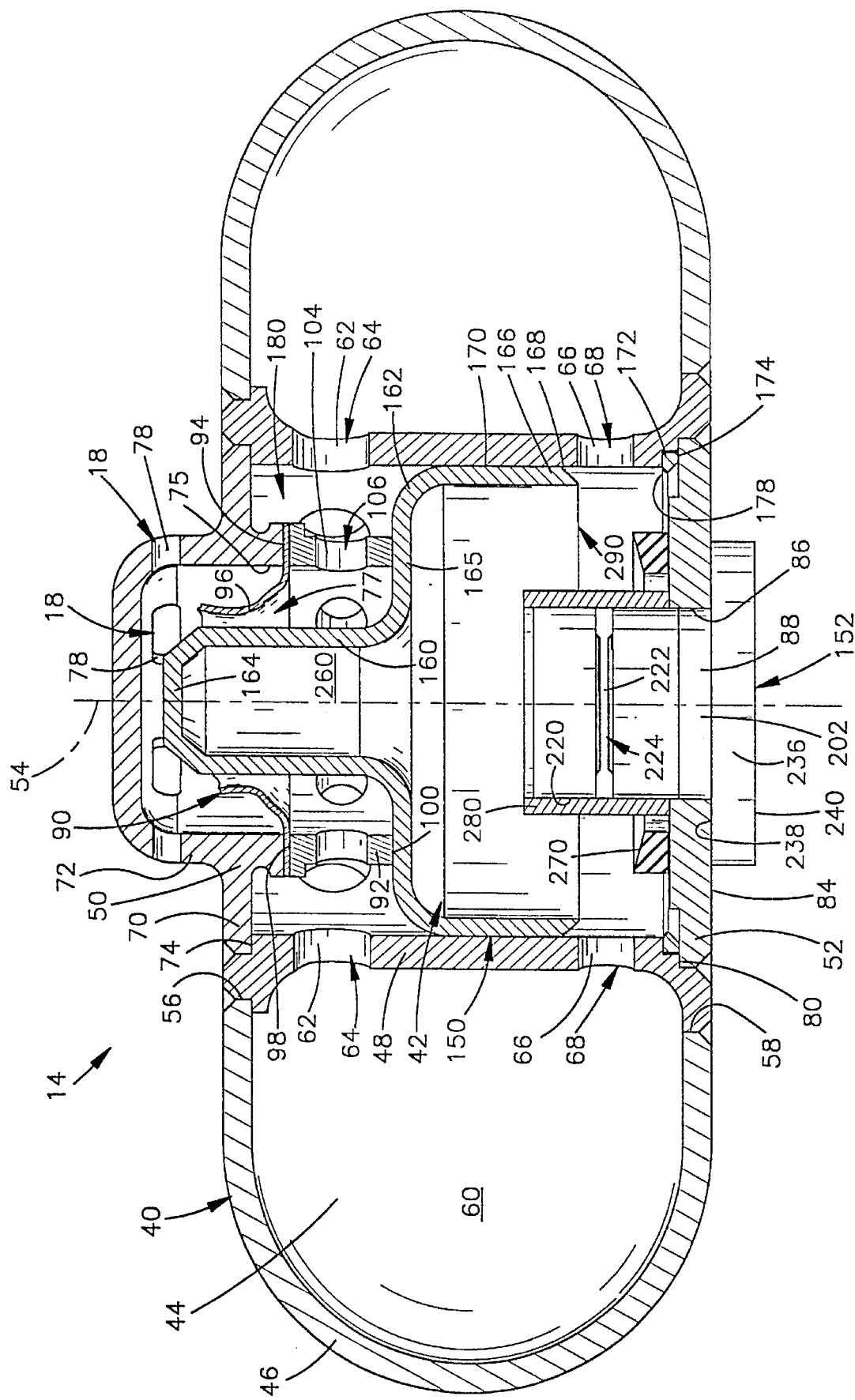
FIG. 4 is a view showing the parts of FIG. 3A in a fully actuated condition.

As shown in greater detail in FIGS. 2–4, the inflator 14 includes a pressure vessel 40 and an actuator assembly 42. The pressure vessel 40 contains pressurized gas, which is preferably argon at approximately 3000 psi, for inflating the air bag 12. The actuator assembly 42 operates to release the gas from the pressure vessel 40 when the switch 34 in the electrical circuit 30 (FIG. 1) is closed upon the occurrence of a vehicle collision, as described above. The actuator assembly 42 further operates to increase the pressure of the gas.

The pressure vessel 40 has a plurality of walls which define a sealed storage chamber 44. The walls of the pressure vessel 40 include an outer wall 46, a core wall 48, an upper end wall 50 and a lower end wall 52, each of which is preferably formed of stainless or low carbon steel. The outer wall 46 extends as a ring around a central axis 54, and has a C-shaped radial section which is open at the radially inner side of the radial section. The outer wall 46 thus has an annular upper edge surface 56 and an annular lower edge surface 58, both of which are centered on the axis 54.

The core wall 48 has a tubular shape centered on the axis 54, and extends axially between the upper and lower edge surfaces 56 and 58 of the outer wall 46. The core wall 48 and the outer wall 46 thus define a radially outer portion 60 of the storage chamber 44 which extends circumferentially entirely around the axis 54 in the shape of a ring.

A plurality of first inner edge surfaces 62 of the core wall 48 define a circumferential row of first gas flow openings 64 extending radially through the core wall 48 near the upper end of the core wall 48. A plurality of second inner edge surfaces 66 of the core wall 48 similarly define a circumferential row of second gas flow openings 68 extending radially through the core wall 48 near the lower end of the core wall 48.

The upper end wall 50 of the pressure vessel 40 has a circular flange portion 70 projecting radially outward from a cylindrical body portion 72, both portions being centered on the axis 54. The flange portion 70 of the upper end wall 50 is supported on a circular, radially extending upper shoulder surface 74 of the core wall 48. The body portion 72 of the upper end wall 50 has a circular lower edge surface 76 and an inner peripheral surface 75 which define a central outlet opening 77 in the body portion 72 below the flange portion 70. The body portion 72 further has a plurality of inner edge surfaces 78 above the flange portion 70. The inner edge surfaces 78 define the gas outlet openings 18 in a row extending circumferentially around the axis 54. The upper end wall 50 of the pressure vessel 40 is thus designed as a diffuser for the gas.

The lower end wall 52 of the pressure vessel 40 also has a circular shape centered on the axis 54, and is supported against a circular, radially extending lower shoulder surface 80 on the core wall 48. The lower end wall 52 has upper and lower side surfaces 82 and 84, respectively. An inner edge surface 86 of the lower end wall 52 defines a circular opening 88 extending through the center of the lower end wall 52. The adjoining surfaces of the outer wall 46, the core wall 48, the upper end wall 50 and the lower end wall 52 are connected to each other by welds (not shown) so as to block leakage of gas between the adjoining surfaces. The outer wall 46 is preferably friction welded to the core wall 48, but could be MIG welded to the core wall 48. The core wall 48 is preferably MIG welded to the upper and lower end walls 50 and 52.

The pressure vessel 40 further includes a closure wall 90 and an inner diffuser wall 92. The closure wall 90 is a circular burst disk with a flat peripheral portion 94 and a dome shaped central portion 96. The peripheral portion 94 of the closure wall 90 is welded, preferably TIG welded, to the lower edge surface 76 of the upper end wall 50. The central portion 96 of the closure wall 90 extends across the opening 77.

The inner diffuser wall 92 has a cylindrical shape with upper and lower end surfaces 98 and 100, respectively. The upper end surface 98 is welded, preferably TIG welded, to the peripheral portion 94 of the closure wall 90. A plurality of inner edge surfaces 104 of the inner diffuser wall 92 define a circumferential row of gas flow openings 106 extending radially through the inner diffuser wall 92.

As shown in FIGS. 2–4, the actuator assembly 42 is supported in the inflator 14 radially inward of the core wall 48. The actuator assembly 42 includes a burst cup 150, an igniter 152, and a body of ignitable propellant material 154.

The burst cup 150 has a plunger portion 160 and a base 162. The plunger portion 160 of the burst cup 150 has a relatively narrow cylindrical shape centered on the axis 54, and includes an upper end wall 164 which closes the upper end of the burst cup 150. The base 162 of the burst cup 150 has a wider cylindrical shape centered on the axis 54, and includes both a circular, radially extending intermediate wall 165 and a cylindrical side wall 166 of the burst cup 150. The cylindrical side wall 166 is open at the lower end of the burst cup 150, and has a cylindrical outer surface 168 which adjoins the cylindrical inner surface 170 of the core wall 48. The cylindrical outer surface 168 thus extends over the second gas flow openings 68 in the core wall 48.

The cylindrical side wall 166 of the burst cup 150 further includes a flange 172 at its lower end, and has a circular lower edge surface 174. The lower edge surface 174 has a recessed portion 176. The recessed portion 176 of the lower edge surface 174 defines a rupturable stress riser portion 178 of the burst cup 150 between the recessed portion 176 and the cylindrical outer surface 168.

The flange 172 on the burst cup 150 is closely received between adjoining surfaces of the core wall 48 and the lower end wall 52 of the pressure vessel 40. One or more welds (not shown), preferably TIG welds, connect the adjoining surfaces of the flange 172, the core wall 48 and the lower end wall 52 securely to each other to block leakage of gas between those adjoining surfaces. A radially inner portion 180 of the storage chamber 44 is thus defined between the burst cup 150, the core wall 48, the upper end wall 50, and the closure wall 90. The radially inner portion 180 of the storage chamber 44 communicates with the radially outer portion 60 through the first gas flow openings 64 in the core wall 48.

Figure 5:
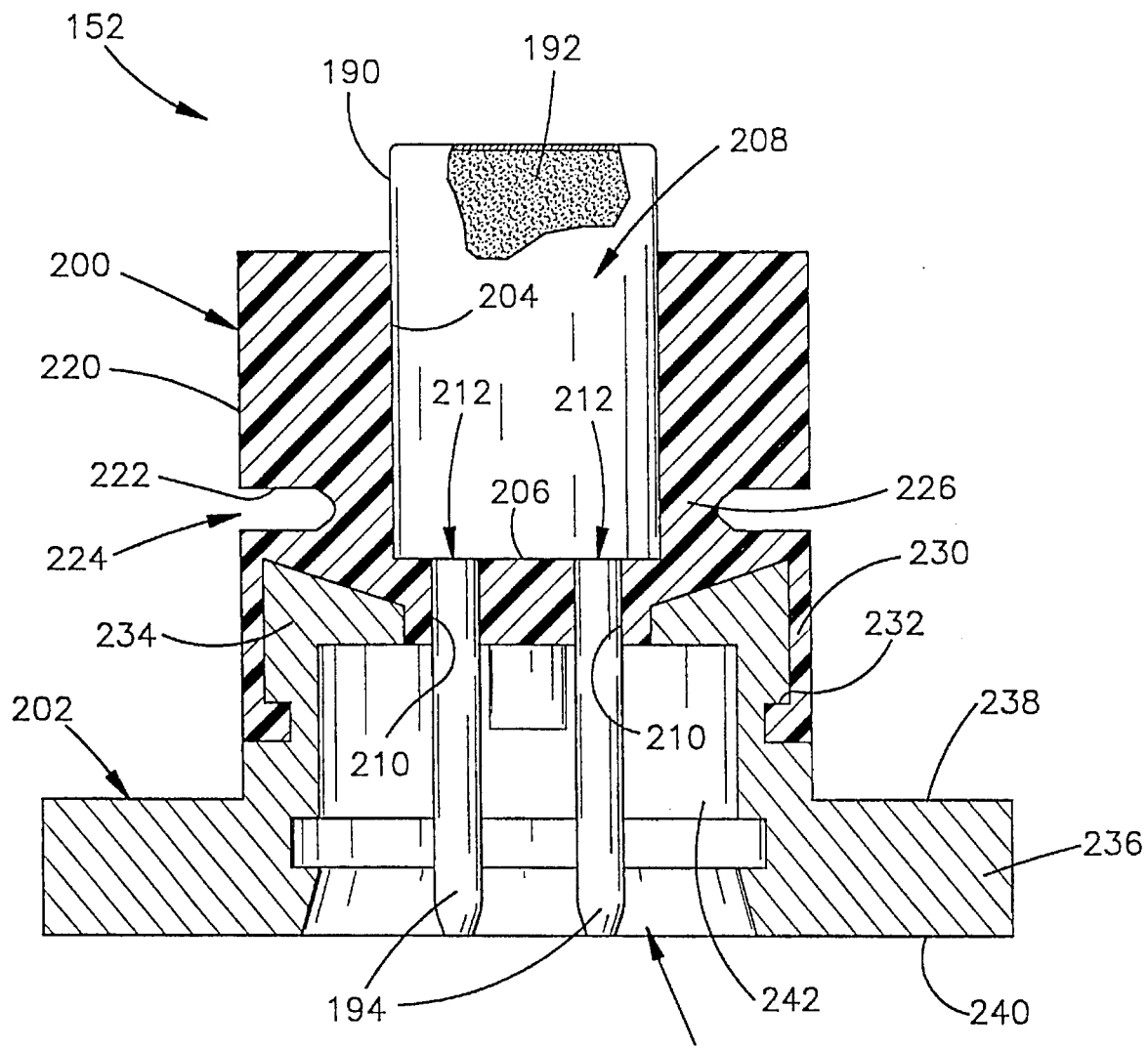
FIG. 5 is an enlarged side view, partly in section, of parts shown in FIGS. 2–4.

As shown in detail in FIG. 5, the igniter 152 includes a cylindrical metal casing 190 containing an ignition charge material 192. The ignition charge material 192 is ignited upon the passage of electric current between a pair of electrical terminals 194, as is known. When the ignition charge material 192 is ignited, it produces combustion products which rupture the casing 190 and emerge upwardly from the casing 190. The ignition charge material 192 preferably comprises $BKN0_3$, but could have any suitable alternative composition known in the art.

As further shown in detail in FIG. 5, the igniter 152 includes a nylon body 200 and a metal retainer 202 which support the casing 190 and the terminals 194. The body 200 has major inner surfaces 204 and 206 defining a cylindrical compartment 208 in which the casing 190 is received. The body 200 also has a pair of minor inner surfaces 210 defining passages 212 through which the terminals 194 extend outward from the compartment 208. The casing 190 and the terminals 194 are received closely within the compartment 208 and the passages 212, respectively, so as to block leakage of gas between the adjoining surfaces of the casing 190, the body 200 and the terminals 194.

The body 200 of the igniter 152 further has a cylindrical outer surface 220. A recessed portion 222 of the outer surface 220 defines a circumferentially extending notch 224. The notch 224 defines a rupturable stress riser portion 226 of the body 200 radially between the notch 224 and the compartment 208. The stress riser portion 226 breaks under the force of the combustion products emerging from the casing 190, and thus ensures that the force of the combustion products will not break the body 200 at a different location where the combustion products could leak downwardly out of the igniter 152.

A cylindrical lower end portion 230 of the body 200 includes an inwardly projecting flange 232, and engages complementary shaped surfaces of an upper end portion 234 of the retainer 202, as shown in FIG. 5. The lower end portion 230 of the body 200 and the upper end portion 234 of the retainer 202 thus establish a mechanical interlock which holds the body 200 on the retainer 202.

The retainer 202 further has a circular base plate portion 236 with upper and lower side surfaces 238 and 240. A cylindrical inner surface 242 of the retainer 202 defines a cavity 244 at the center of the retainer 202. The terminals 194 extend through the cavity 244 from the body 200 to the plane of the lower side surface 240 of the retainer 202.

As shown in FIGS. 2–4, the igniter 152 extends axially into the burst cup 150 in the opening 88 at the center of the lower end wall 52 of the pressure vessel 40. Specifically, the body 200 of the igniter 152 is received closely in the opening 88, and the upper side surface 238 of the retainer 202 abuts the lower side surface 84 of the lower end wall 52. One or more welds (not shown), preferably comprising a TIG weld between the lower end wall 52 and the base plate portion 236 of the igniter 152, block leakage of gas outward through the opening 88 between the igniter 152 and the lower end wall 52. A sealed combustion chamber 260 is thus defined within the burst cup 150. The combustion chamber 260 is closed at the upper end of the burst cup 150 by the upper end wall 164, and is closed at the lower end of the burst cup 150 by the igniter 152 and the lower end wall 52 of the pressure vessel 40.

The body of ignitable propellant material 154 is contained within the combustion chamber 260. In the preferred embodiments of the invention, the propellant material 154 is formed as a ring shaped body extending circumferentially around the axis 54, and has the following composition:

| % By Weight | Ingredient |
| --- | --- |
| 73% | Potassium perchlorate |
| 8.7% | Dioctyl adipate |
| 6.6% | Polyvinyl chloride |
| 0.05% | Carbon Black |
| 0.15% | Stabilizers (Boron, Chromium) |
| 11.5% | Potassium nitrate |

Alternatively, the propellant material 154 could have any other suitable composition known in the art, and also could be formed in one or more pieces as known in the art. An elastomeric cushioning ring 270, preferably formed of silicone, holds the ring shaped body of propellant material 154 firmly in place between the intermediate wall 165 of the burst cup 150 and the lower end wall 52 of the pressure vessel 40.

A cylindrical igniter shield 280 also is located within the combustion chamber 260. The igniter shield 280 extends closely around the cylindrical outer surface 220 of the body 200 of the igniter 152, and extends axially from the lower end wall 52 to the intermediate wall 165 of the burst cup 150. The igniter shield 280 thus protects the igniter 152 from damage which might otherwise be caused by the intermediate wall 165 of the burst cup 150. Specifically, the combustion chamber 260 is not pressurized before the inflator 14 is actuated, while the storage chamber 44 is filled with the pressurized gas. The pressure differential between the combustion chamber 260 and the radially inner portion 180 of the storage chamber 44 causes the intermediate wall 165 of the burst cup 150 to deflect downward toward the igniter 152. The igniter shield 280 blocks the downward deflection, as shown in FIG. 3A, while the storage chamber 44 is filled with the pressurized gas.

When the inflator 14 is assembled into the module 22 shown in FIG. 1, the electrical circuit 30 extends through the igniter 152 between the terminals 194. Therefore, when the vehicle experiences a collision, the ignition charge material 192 is ignited as a result of the passage of electric current between the terminals 194 upon closing of the switch 34. The combustion products which then emerge from the casing 190 move forcefully against the burst cup 150 so as to lift the intermediate wall 165 upward from the position shown in FIG. 3A to the position shown in FIG. 3B. The intermediate wall 165 is thus moved off of the igniter shield 280 to clear the way for the combustion products to move throughout the combustion chamber 260 and into contact with the propellant material 154 to ignite the propellant material 154. As the propellant material 154 burns in the combustion chamber 260, it produces further combustion products including heat. As a result, the gas pressure within the combustion chamber 260 increases rapidly to an elevated level.

The increasing pressure within the combustion chamber 260 results in a force which acts axially upward against the burst cup 150. When the force of the increasing pressure reaches a predetermined elevated level, it ruptures the stress riser portion 178 of the burst cup 150. A severed piston portion 290 of the burst cup 150 is thus released, as shown in FIG. 4, for movement axially upward under the influence of the force of the pressure within the combustion chamber 260. The force of the pressure within the combustion chamber 260 then acts as a thrust which propels the piston portion 290 of the burst cup 150 axially upward from the position of FIG. 3B to the position of FIG. 4. The lower end surface 100 of the inner diffuser wall 92 serves as a stop surface to limit upward movement of the piston portion 290 of the burst cup 150.

When the piston portion 290 of the burst cup 150 moves axially upward from the position of FIG. 3B to the position of FIG. 4, the plunger portion 160 of the burst cup 150 moves forcefully against and through the central portion 96 of the closure wall 90. The plunger portion 160 of the burst cup 150 thus ruptures the closure wall 90 to open the outlet opening 77 and to release the gas from the storage chamber 44. Additionally, the portion of the cylindrical side wall 166 which is included in the piston portion 290 of the burst cup 150 moves axially away from the second gas flow openings 68 in the core wall 48 to uncover the inner ends of the second gas flow openings 68. The pressurized combustion products within the combustion chamber 260 are thus released to flow radially outward through the second gas flow openings 68 and into the radially outer portion 60 of the storage chamber 44. The heat of those combustion products then increase the temperature, pressure and quantity of the gas in the storage chamber 44. As a result, a large volume of gas is rapidly directed from the inflator 14 into the air bag 12 to inflate the air bag 12.

Figure 6:
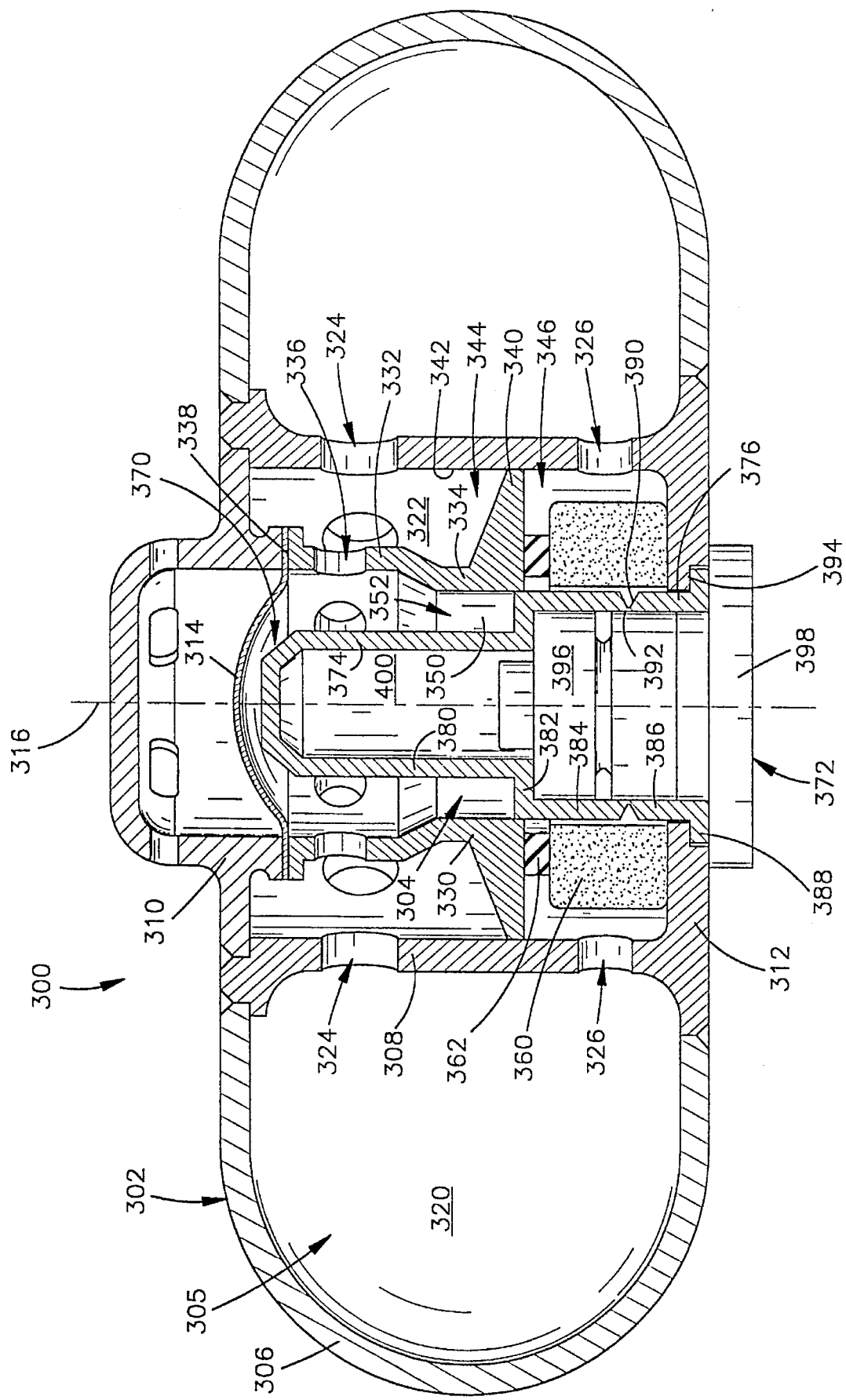
FIG. 6 is a side view, partly in section, of parts of a vehicle occupant restraint apparatus which is constructed as a second embodiment of the present invention.
Figure 7:
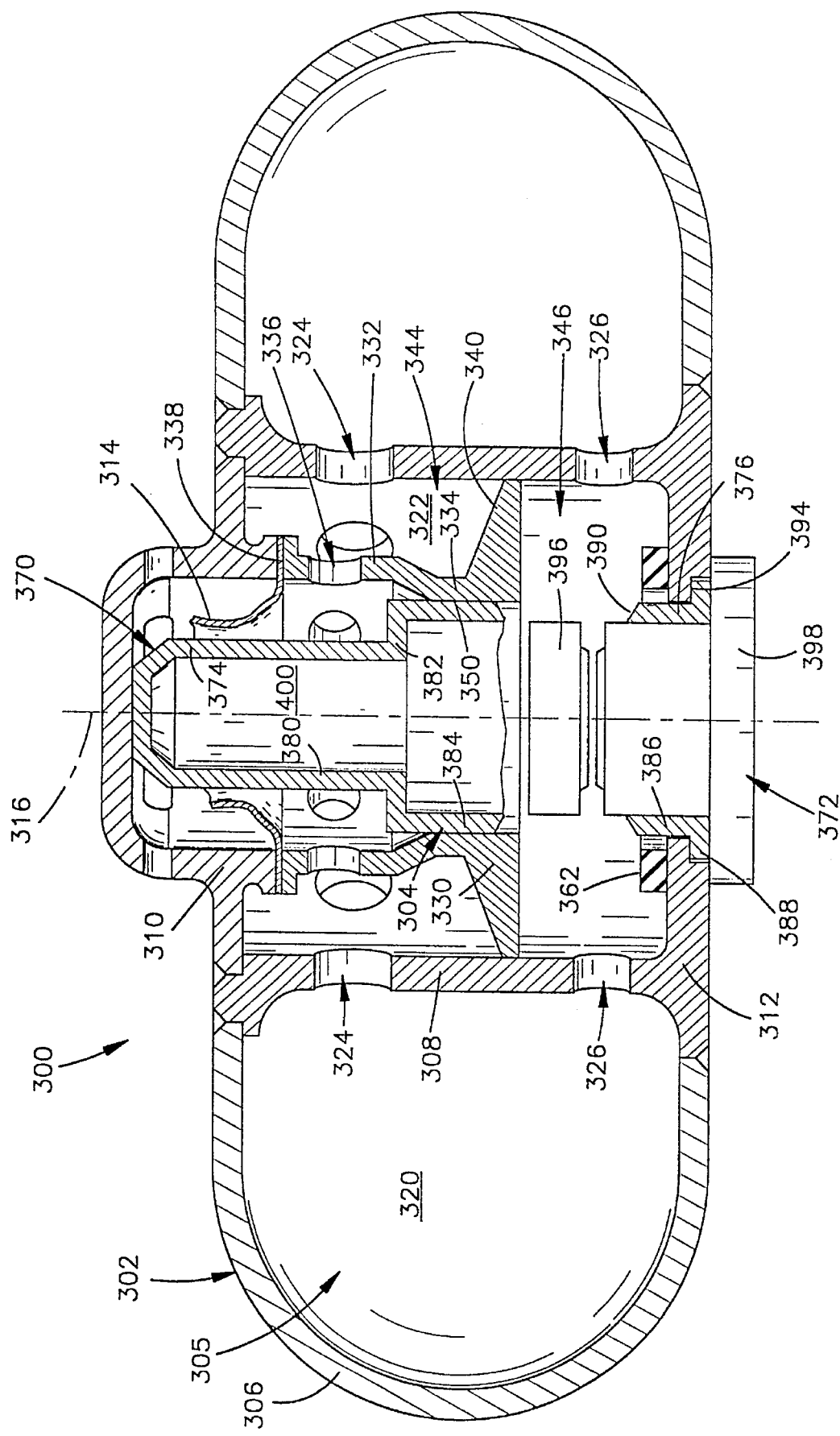
FIG. 7 is a view showing the parts of FIG. 6 in an actuated condition.

An inflator 300 constructed as a second embodiment of the present invention is shown in FIGS. 6 and 7. The inflator 300 is a substitute for the inflator 14 in the vehicle occupant restraint apparatus 10 of FIG. 1. The inflator 300 thus includes a pressure vessel 302 and an actuator assembly 304. The pressure vessel 302 contains pressurized gas, which is preferably argon at approximately 3000 psi, for inflating the air bag 12. The actuator assembly 304 operates to release the gas from the pressure vessel 302 when the switch 34 in the electrical circuit 30 (FIG. 1) is closed upon the occurrence of a vehicle collision. The actuator assembly 304 further operates to increase the pressure of the gas.

The pressure vessel 302 has a plurality of walls which define a sealed storage chamber 305. The walls of the pressure vessel 302 include an outer wall 306, a core wall 308, upper and lower end walls 310 and 312, and a closure wall 314, each of which is centered on an axis 316. The outer wall 306, the upper end wall 310 and the closure wall 314 are substantially similar to the corresponding parts of the pressure vessel 40 in the first embodiment of the present invention described above. However, the core wall 308 and the lower end wall 312 in the pressure vessel 302 differ somewhat from the core wall 48 and the lower end wall 52 in the pressure vessel 40 in that the core wall 308 is formed as one piece with the lower end wall 312. The walls of the pressure vessel 302 are formed of the same material and are welded to each other in the same manner as in the pressure vessel 40.

As in the pressure vessel 40, the adjoining surfaces of the walls of the pressure vessel 302 are sealed together by welds (not shown) so as to block the leakage of gas between the adjoining surfaces. The walls of the pressure vessel 302 thus define a radially outer portion 320 of the storage chamber 305 in the shape of a ring between the core wall 308 and the outer wall 306. The walls of the pressure vessel 302 further define a radially inner portion 322 of the storage chamber 305. The radially inner portion 322 has a cylindrical shape extending axially within the core wall 308 between the upper and lower end walls 310 and 312. The radially outer portion 320 of the storage chamber 305 and the radially inner portion 322 are in fluid communication with each other through first and second gas flow openings 324 and 326, respectively, in the core wall 308.

The pressure vessel 302 further includes an inner diffuser wall 330 with an upper end portion 332 and a lower end portion 334. The upper end portion 332 of the inner diffuser wall 330 is substantially similar to the inner diffuser wall 92 in the first embodiment of the present invention described above, and thus has a plurality of gas flow openings 336 and an upper end surface 338 which is welded, preferably TIG welded, to the closure wall 314. The lower end portion 334 of the inner diffuser wall 330 includes a flange 340 which extends radially outward into abutting engagement with the cylindrical inner surface 342 of the core wall 308. The flange 340 thus divides the radially inner portion 322 of the storage chamber 305 into upper and lower sections 344 and 346 which are located on axially opposite sides of the flange 340. A cylindrical inner surface 350 of the inner diffuser wall 330 defines a bore 352 centered on the axis 314.

A ring shaped body of ignitable propellant material 360 is contained within the storage chamber 305 in the lower section 346 of the radially inner portion 322. The propellant material 360 preferably has the composition set forth above for the propellant material 154 in the first embodiment of the present invention. An elastomeric cushioning ring 362 holds the propellant material 360 firmly in place between the lower end wall 312 of the pressure vessel 302 and the flange 340 on the inner diffuser wall 330.

The actuator assembly 304 in the inflator 300 includes an ignition cup 370 and an igniter 372. The ignition cup 370 has a cylindrical shape centered on the axis 316, and has a piston portion 374 and a base 376. The piston portion 374 of the ignition cup 370 has a cylindrical plunger wall 380 which is closed at its upper end, a circular, radially extending intermediate wall 382, and a cylindrical side wall 384. The base 376 of the ignition cup 370 also has a cylindrical side wall 386, and has an open lower end which is defined in part by a flange 388. A recessed peripheral surface portion of the ignition cup 370 defines a circumferential notch 390. The notch 390 in turn defines a rupturable stress riser portion 392 of the ignition cup 370 which is located axially between the piston portion 374 and the base 376. The flange 388 at the lower end of the ignition cup 370 is supported against an annular lower shoulder surface 394 of the lower end wall 312.

The igniter 372 is the same as the igniter 152 in the first embodiment of the present invention described above. The igniter 372 thus has a cylindrical body 396 and a circular base wall 398. The igniter 372 is centered on the axis 316, with the body 396 adjoining the inner surfaces of the intermediate wall 382 and the side walls 384 and 386 of the ignition cup 370. The base wall 398 of the igniter 372 adjoins the lower surfaces of the flange 388 on the ignition cup 370 and the lower end wall 312 of the pressure vessel 302. One or more welds (not shown), preferably TIG welds, block the leakage of gas between the adjoining surfaces of the lower end wall 312, the ignition cup 370 and the base wall 398 of the igniter 372. The igniter 372 and the ignition cup 370 thus define a sealed pressure chamber 400 within the ignition cup 370. An igniter shield like the igniter shield 280 is not needed in the second embodiment of the invention because the intermediate wall 382 of the ignition cup 370 has an outer surface area which is small enough to preclude inward deflection of the intermediate wall 382 under the pressure of the gas in the storage chamber 305.

When the igniter 372 is actuated upon closing of the switch 34 in the electrical circuit 30 (FIG. 1), the igniter 372 expels combustion products into the pressure chamber 400. The pressure within the pressure chamber 400 then increases rapidly to an elevated level at which the force of the pressure acting against the ignition cup 370 ruptures the stress riser portion 392 of the ignition cup 370. The force of the pressure in the pressure chamber 400 then acts as a thrust which propels the piston portion 374 of the ignition cup 370 axially upward from the position shown in FIG. 6 to the position shown in FIG. 7. The cylindrical inner surface 350 of the inner diffuser wall 330 guides the side wall 384 of the piston portion 374 along the axis 316 so that the piston portion 374 remains centered on the axis 316 as it moves from the position of FIG. 6 to the position of FIG. 7. The upper end wall 310 of the pressure vessel 302 limits upward movement of the piston portion 374, as shown in FIG. 7.

When the piston portion 374 of the ignition cup 370 moves from the position of FIG. 6 to the position of FIG. 7, it ruptures the closure wall 314 to release the gas from the storage chamber 305. Additionally, the piston portion 374 of the ignition cup 370 releases the pressurized combustion products in the pressure chamber 400 to flow radially outward between the side wall 384 of the piston portion 374 and the side wall 386 of the base 376. Those combustion products thus move into the lower section 346 of the storage chamber 305 to ignite the propellant material 360. The combustion products which result from combustion of the propellant material 360, including heat, flow radially outward through the second gas flow openings 326 in the core wall 308 and throughout the storage chamber 305 to increase the pressure of the gas in the storage chamber 305. Like the inflator 14 described above, the inflator 300 thus supplies a large volume of pressurized gas which rapidly inflates the air bag 12. However, the operation of the inflator 300 differs somewhat from the operation of the inflator 14 in that the pressure vessel 302 is opened substantially simultaneously with ignition of the propellant material 360. In comparison, the pressure vessel 40 is opened after the combustion products of the propellant material 154 have developed the thrust which severs and moves the piston portion 290 of the burst cup 150. The combustion products of the propellant material 154 thus mix with the gas to increase the pressure and quantity of the gas as the pressure vessel 40 is opened. The combustion products of the propellant material 360 mix with the gas after the pressure vessel 302 is opened. The inflator 300 thus tends to inflate the air bag 12 more gradually.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for inflating an inflatable device, said apparatus comprising:

means for defining a sealed storage chamber containing inflation fluid for inflating the inflatable device, said means having walls which encircle an axis and which define a ring shaped portion of said storage chamber centered on said axis, said means further having a closure wall which is rupturable to open an outlet opening through which said inflation fluid flows outward from said storage chamber;

an ignitable material which produces combustion products including heat for heating and pressurizing said inflation fluid in said storage chamber;

a cup member located radially inward of said walls which define said ring shaped portion of said storage chamber, said cup member having a piston portion which is movable between an unactuated position and an actuated position, said piston portion of said cup member including a plunger means for rupturing said closure wall upon movement of said piston portion from said unactuated position to said actuated position, said cup member further having a rupturable portion which holds said piston portion in said unactuated position; and igniter means for igniting said ignitable material and for causing pressure to develop a thrust against said cup member, said thrust rupturing said rupturable portion of said cup member and propelling said piston portion of said cup member from said unactuated position to said actuated position;

said cup member having a cylindrical combustion chamber wall extending circumferentially around said ignitable material, said piston portion of said cup member including a movable portion of said combustion chamber wall which moves axially away from said ignitable material upon movement of said piston portion toward said actuated position;

said walls including a tubular wall surrounding said cup member, said tubular wall having surfaces defining a plurality of gas flow openings which communicate the interior of said tubular wall with said ring shaped portion of said storage chamber, said movable portion of said combustion chamber wall extending over said gas flow openings to block the passage of said combustion products radially outward through said gas flow openings when said piston portion of said cup member is in said unactuated position, said movable portion of said combustion chamber wall being spaced axially from said gas flow openings to permit said combustion products to flow radially outward through said gas flow openings when said piston portion of said cup member is in said actuated position.

2. Apparatus for inflating an inflatable device, said apparatus comprising:

means for defining a sealed storage chamber containing inflation fluid for inflating the inflatable device, said means having walls which encircle an axis and which define a ring shaped portion of said storage chamber centered on said axis, said means further having a closure wall which is rupturable to open an outlet opening through which said inflation fluid flows outward from said storage chamber;

an ignitable material which produces combustion products including heat for heating and pressurizing said inflation fluid in said storage chamber;

a cup member located radially inward of said walls which define said ring-shaped portion of said storage chamber, said cup member including a piston means for rupturing said closure wall upon movement of said piston means into a forceful impact with said closure wall, said cup member further having a rupturable means for holding said piston means in an unactuated position spaced from said closure wall;

igniter means for igniting said ignitable material and for causing pressure to develop a thrust against said cup member, said rupturable means being ruptured by said thrust to release said piston means for movement from said unactuated position when said pressure reaches a predetermined elevated level, said thrust then propelling said piston means from said unactuated position into a forceful impact with said closure wall to rupture said closure wall, said cup member having a combustion chamber wall extending around a peripheral side of said ignitable material, a portion of said combustion chamber wall located between said closure wall and said rupturable means moving in a direction away from said ignitable material in response to ignition of said ignitable material; and directing means for directing said combustion products into said ring-shaped portion of said storage chamber to cause said combustion products to heat and pressurize said inflation fluid at a location inside said ring-shaped portion of said storage chamber.

3. Apparatus as defined in claim 2 wherein said igniter means comprises an electrically actuatable igniter, said igniter having a casing which is ruptured and from which combustion products emerge when said igniter is actuated, said ignitable material comprising a body of ignitable propellant material located outside said casing.

4. Apparatus as defined in claim 3 wherein said igniter further comprises a body member having a compartment in which said casing is received, said body member having means for defining a stress riser which surrounds said compartment, said stress riser being rupturable by said combustion products emerging from said casing.

5. Apparatus for inflating an inflatable device, said apparatus comprising:

means for defining a sealed storage chamber containing inflation fluid for inflating the inflatable device, said means having walls which encircle an axis and which define a ring shaped portion of said storage chamber centered on said axis, said means further having a closure wall which is rupturable to open an outlet opening through which said inflation fluid flows outward from said storage chamber;

an ignitable material which produces combustion products including heat for heating and pressurizing said inflation fluid in said storage chamber;

a cup member located radially inward of said walls which define said ring shaped portion of said storage chamber, said cup member having a piston portion which is movable between an unactuated position and an actuated position, said piston portion of said cup member including a plunger means for rupturing said closure wall upon movement of said piston portion from said unactuated position to said actuated position, said cup member further having a rupturable portion which holds said piston portion in said unactuated position; and igniter means for igniting said ignitable material and for causing pressure to develop a thrust against said cup member, said thrust rupturing said rupturable portion of said cup member and propelling said piston portion of said cup member from said unactuated position to said actuated position;

said igniter means including an igniter which emits combustion products for igniting said ignitable material, said cup member including wall means for defining a sealed pressure chamber which is separate from said storage chamber and in which said combustion products emitted by said igniter are contained under pressure to develop said thrust, said ignitable material being located inside said storage chamber with said inflation fluid.

6. Apparatus as defined in claim 5 wherein said wall means of said cup member blocks fluid communication between said pressure chamber and said storage chamber, said thrust opening fluid communication between said pressure chamber and said storage chamber upon rupturing said rupturable portion of said cup member, said fluid communication enabling said combustion products emitted from said igniter to enter said storage chamber to ignite said ignitable material inside said storage chamber.

7. Apparatus as defined in claim 6 wherein said walls include a tubular inner wall which defines a cylindrical portion of said storage chamber located radially inward of said ring shaped portion of said storage chamber, said tubular inner wall having surfaces defining a plurality of gas flow openings communicating said cylindrical portion of said storage chamber with said ring shaped portion of said storage chamber, said ignitable material being located in said cylindrical portion of said storage chamber in fluid communication with said ring shaped portion of said storage chamber through said gas flow openings.

* * * * *